(12) United States Patent
Ohm (10) Patent No.: US 7,204,647 B2
(45) Date of Patent: Apr. 17, 2007

(54) MONITORING A SEMICONDUCTOR LASER UTILIZING AN INCORPORATED BEAM SPLITTER DEVICE

(76) Inventor: David R. Ohm, 11884 SW. Morning Hill Dr., Tigard, OR (US) 97223

( * ) Notice: Subject to any disclaimer, the term of this patent is extended or adjusted under 35 U.S.C. 154(b) by 0 days.

(21) Appl. No.: 10/087,878

(22) Filed: Mar. 1, 2002

(65) Prior Publication Data

US 2003/0165304 A1 Sep. 4, 2003

(51) Int. Cl.
*G02B 6/42* (2006.01)

(52) U.S. Cl. ...................................................... 385/92

(58) Field of Classification Search ................. 385/14, 385/15, 31, 88–94; 372/43.5; 438/27; 250/239
See application file for complete search history.

(56) References Cited

U.S. PATENT DOCUMENTS 4,627,688 A * 12/1986 Kobayashi et al. ......... 359/634
5,611,006 A * 3/1997 Tabuchi ....................... 385/14
5,701,396 A * 12/1997 Liedenbaum et al. ......... 706/40
5,920,420 A * 7/1999 Ishikura et al. ............. 359/282
6,021,238 A * 2/2000 Spaeth ......................... 385/31
6,496,623 B2 * 12/2002 Asakura et al. ............... 385/47
2002/0126345 A1 9/2002 Green et al.

* cited by examiner

*Primary Examiner*—Michelle Connelly-Cushwa
(74) *Attorney, Agent, or Firm*—Berkeley Law & Technology Group, LLP (57) ABSTRACT

A method and apparatus for monitoring of a semiconductor light source utilizing a beamsplitter within a photonic package is described, wherein the photonic package comprises a housing, a semiconductor light source disposed within the housing. The semiconductor light source has a first light beam output having data encoded thereon. A beam splitter cube (BSC) also disposed inside the housing to create a first split output of the first light beam output. The BSC has a light beam splitting characteristic that negatively impacts the encoding of the data in the first light beam within a predetermined limited threshold. A photodetector is disposed inside the housing to receive the first split output. The photodetector is adapted to determine properties of the first split output notwithstanding that the first split output is created in the limited impact manner.

32 Claims, 4 Drawing Sheets

MONITORING A SEMICONDUCTOR LASER UTILIZING AN INCORPORATED BEAM SPLITTER DEVICE

FIELD OF INVENTION

The present invention relates to the field of optical components. More specifically, the present invention relates to monitoring a semiconductor laser utilizing a beam splitter type device.

BACKGROUND OF THE INVENTION

The widespread deployment of high-speed networking and communications equipment has produced a large demand for various types of networking communication components and subsystems. Included among these, are packages, which are often referred to as photonic packages.

An important aspect of optical components, such as optical components used in telecommunications and data communications technology (i.e., lightwave communications), is the monitoring of a semiconductor light source within a photonic package. Often times, the semiconductor light source may be in the form of a semiconductor laser. Monitoring of the semiconductor light source, such as the semiconductor laser, is important because light emitted from the semiconductor light source carries data. In order to facilitate monitoring of the semiconductor laser, often times, the semiconductor laser is manufactured in such a way as to emit light in two directions. The two directions that the semiconductor laser may emit light are known as a front facet and a back facet.

Light emitted from the front facet of the semiconductor laser is commonly coupled to an optical fiber for data transmission. Light emitted from the back facet is commonly provided to a photodiode for monitoring. Because light emitted from the back facet is a percentage of the light emitted from the front facet, monitoring the light emitted from the back facet provides information regarding light emitted from the front facet. This monitoring is commonly referred to as back-facet monitoring (BFM). Accordingly, various information regarding light being provided to the optical fiber for transmission may be determined from the photodiode monitoring light emitted from the back facet.

Conventional photonic packages typically include a case, or housing, within which electrical and optical components, such as the semiconductor laser and the photodiode, are enclosed. Such a housing provides physical protection for the components therein, and provides thermal conductivity so that heat may be dissipated from the components disposed within the case. The number of components may be numerous. However, a requirement of the housing is that the housing be of a small form factor. Accordingly, in order to have the components within a housing of a small form factor, placement of the components is an important aspect of the photonic package.

Placement of the components may be determined by one component's operation relative to another's. For example, as described above, a component, such as a semiconductor light source, that operates to provide light-based signals is placed in such a manner as to be optically coupled to another component, such as an optical fiber, that operates to optically transmit light-based signals. Accordingly, placement of the photodetector is opposite the side of the semiconductor light source coupled to the optical fiber.

As the sophistication of the photonic packages increases, the number of components may increase as well. However, the form factor of the housing of the photonic package continues to become smaller. As a result, placement of the photodetector in the light path opposite the optical fiber side of the semiconductor light source becomes increasingly difficult due to various components included in the housing.

Thus, an improved approach for monitoring a semiconductor light source within a photonic package is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention facilitates monitoring of a semiconductor light source utilizing a beamsplitter within a photonic package. These and other advantages will be evident from the disclosure to follow.

In the following description, various aspects of the invention will be described. However, it will be apparent to those skilled in the art that the invention may be practiced with only some or all described aspects. For purposes of explanation, specific numbers, materials, and configurations are set forth in order to provide a thorough understanding of the invention. However, it will also be apparent to one skilled in the art that the invention may be practiced without specific details. In other instances, well-known features are omitted or simplified in order not to obscure the invention. Similarly, for purposes of explanation, specific numbers, materials and configurations are set forth in order to provide a thorough understanding of the invention. Nevertheless, the invention may be practiced without specific details. In other instances, well-known features are omitted or simplified in order not to obscure the invention. Furthermore, it is understood that the various embodiments shown in the figures are illustrative representations and are not necessarily drawn to scale.

References throughout this specification to "one embodiment" or "an embodiment" means that a particular feature, structure, material, or characteristic described in connection with the embodiment, is included in at least one embodiment of the invention. Thus, the appearances of the phrase "in one embodiment" of "in an embodiment" in various places throughout this specification are not necessarily all referring to the same embodiment or invention. Furthermore, the particular features, structures, materials, or characteristics may be combined in any suitable manner in one or more embodiments.

For the purposes of describing the invention, lightwaves will be illustrated as straight lines. However, one skilled in the relevant art will appreciate that lightwaves may behave as waves or particles. Additionally, certain established principles of physics will not be described in detail, in particular, derivations of equations such as those describing the behavior of semiconductors and the like will not be described in detail. However, relevant equations will be described but not derived.

Accordingly, the concept of data carried by lightwaves will not be described in detail. However, for the purposes of the invention, the concept of utilizing different wavelengths of lightwaves to carry different data may be referred to in describing the invention.

Figure 1:
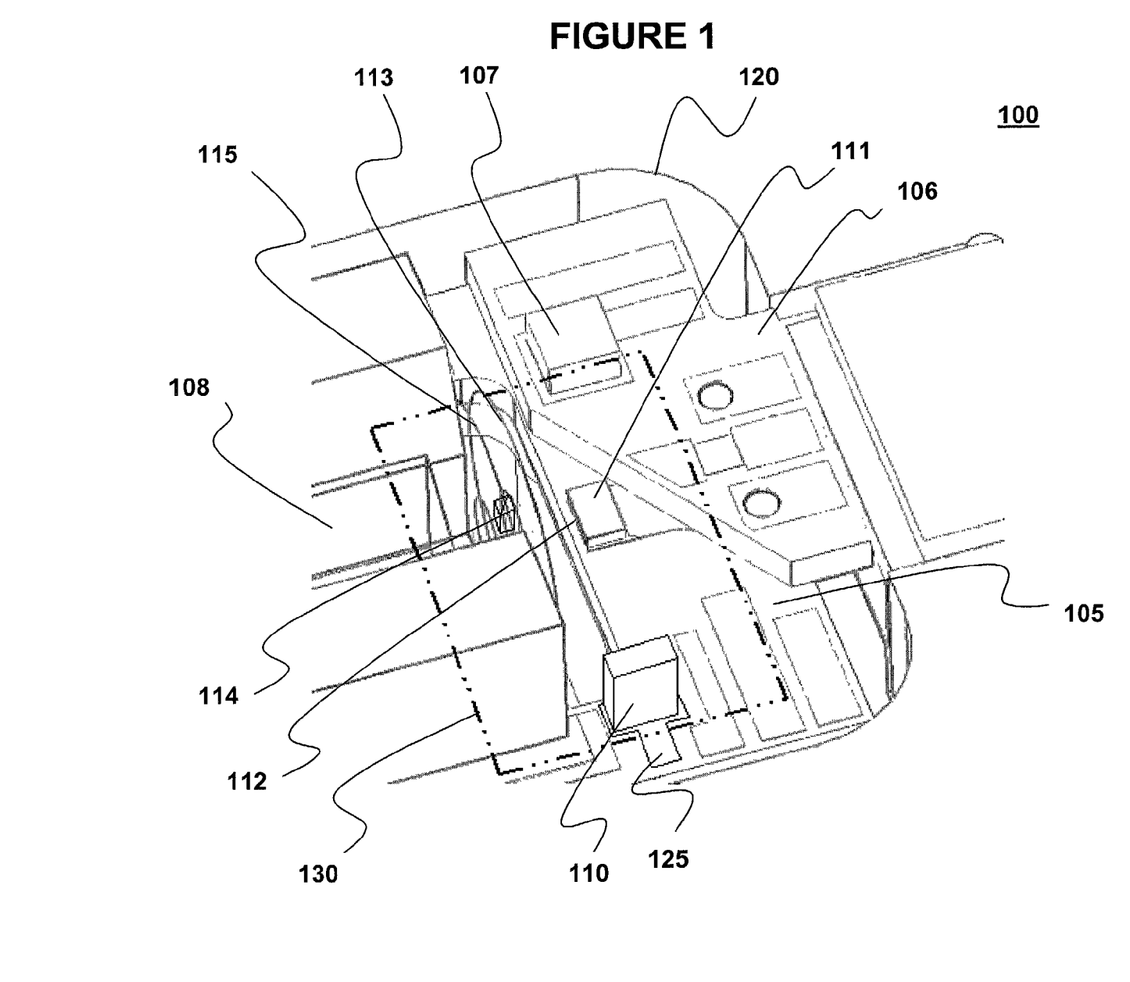
FIG. 1 illustrates an exemplary photonic package with which an embodiment of the present invention may be practiced.

FIG. 1 illustrates an exemplary photonic package with which an embodiment of the present invention may be practiced. Illustrated in FIG. 1, is a perspective view of a photonic package 100. The photonic package 100 includes a first substrate 105 upon which various components are mounted. The various components may include components such as, but not limited to, a second substrate 106, an integrated circuit 107 mounted on the second substrate 106, and a representation of an optical fiber 108. Additionally, the photonic package 100 includes a photodetector 110 and a semiconductor light source 111, both mounted on the first substrate 105. The semiconductor light source 111, in particular, has a front facet 112. In one embodiment, a first lens 113 is optically coupled to the front facet 112 of the semiconductor light source 111, a beam splitter cube (BSC) 114 is optically coupled to the first lens 113, and a second lens 115 is optically coupled to the BSC 114 and the optical fiber 108. As illustrated in FIG. 1, the photonic package 100 may be included in a housing 120 to provide physical protection for the components therein.

Illustrated in FIG. 1, the second substrate 105 may provide an additional platform, upon which, various components, such as, but not limited to, the integrated circuit 107, may be mounted. The integrated circuit 107 may be a thermally sensitive device, such as, but not limited to, a thermistor. The first and second substrates 105–106 and the integrated circuit 107 are known in the art, and accordingly, will not be further described. However, as alluded to earlier, it should be appreciated that the components, such as, but not limited to, the first and second substrates 105–106 and the integrated circuit 107, are illustrated to provide an example of limited space within a typical photonic package.

The semiconductor light source 111 provides light via the front facet 112 to the optical fiber 108. The semiconductor light source 111 may be a semiconductor laser, such as, but not limited to, a gallium arsenide (GaAs) type laser. The semiconductor light source is known in the art, and accordingly, will not be described in further detail.

Illustrated in FIG. 1, in one embodiment, the photodetector 110 is advantageously disposed in a substantially perpendicular manner to an optical path of the semiconductor light source 111, where the optical path may be a path that a beam of light would travel from the semiconductor light source 111 to the optical fiber 108. Additionally, illustrated in FIG. 2, the photodetector 110 is disposed on a tracing 125 to facilitate transmission of electrical signals output by the photodetector 110 responsive to received light to a processor (not shown). The photodetector 110 is adapted to produce an electrical signal responsive to received light based at least upon properties of the photodetector 110 such as, but not limited to, spectral responsivity, external quantum efficiency, noise, response time, dark current, and junction capacitance. The photodetector 110 may be a photodiode, such as, but not limited to, p-layer, intrinsic layer, and n-layer (p-i-n) junction photodiode, an Schottky photodiode, or an avalanche photodetector. As will be described in further detail below, disposing the photodetector 110 as shown facilitates monitoring of the semiconductor light source 111 away from the limited space behind the semiconductor light source 111.

Additionally, in the embodiment illustrated in FIG. 1, the first lens 113 facilitates modification of light emitted from the semiconductor light source 111. The second lens 115 facilitates modification further modification of light emitted from the semiconductor light source 111 to be provided to the optical fiber 108. The lenses 113 & 115 may be of any type to modify light based at least upon principles of Hermite-Gaussian beam (i.e., laser light). The lenses 113 & 115 may be made of any type of a high quality glass, such as, but not limited to, BK7 glass. Focusing of the lenses 113 & 115 to modify light is known, and accordingly, will not be described. Additionally, in the illustrated embodiment of FIG. 1, two lenses 113 & 115 are shown, however, it should be appreciated by those skilled in the art that the first lens may be omitted (i.e., non-collimated light) within the spirit and scope of the present invention. However, for the purpose describing the present invention, the desired modification of light by the lenses 113 & 115 will be described.

Utilization of the BSC 114 with the semiconductor light source 111, the first and second lenses 113 & 115, and the photodetector 110, advantageously facilitates selective placement of the photodetector 110.

For ease of understanding the present invention, detail area 130, including the semiconductor light source 111, the first and second lenses 113 & 115, the optical fiber 108, the photodetector 110, and the BSC 114, will be described in further detail below.

Before describing these elements in further detail, it should be noted that while for ease of explanation, the present invention is being described in the context of photonic packages, however, based on the description to follow, a person skilled in the art will appreciated that the present invention may be adapted for other applications besides photonic packages.

Figure 2:
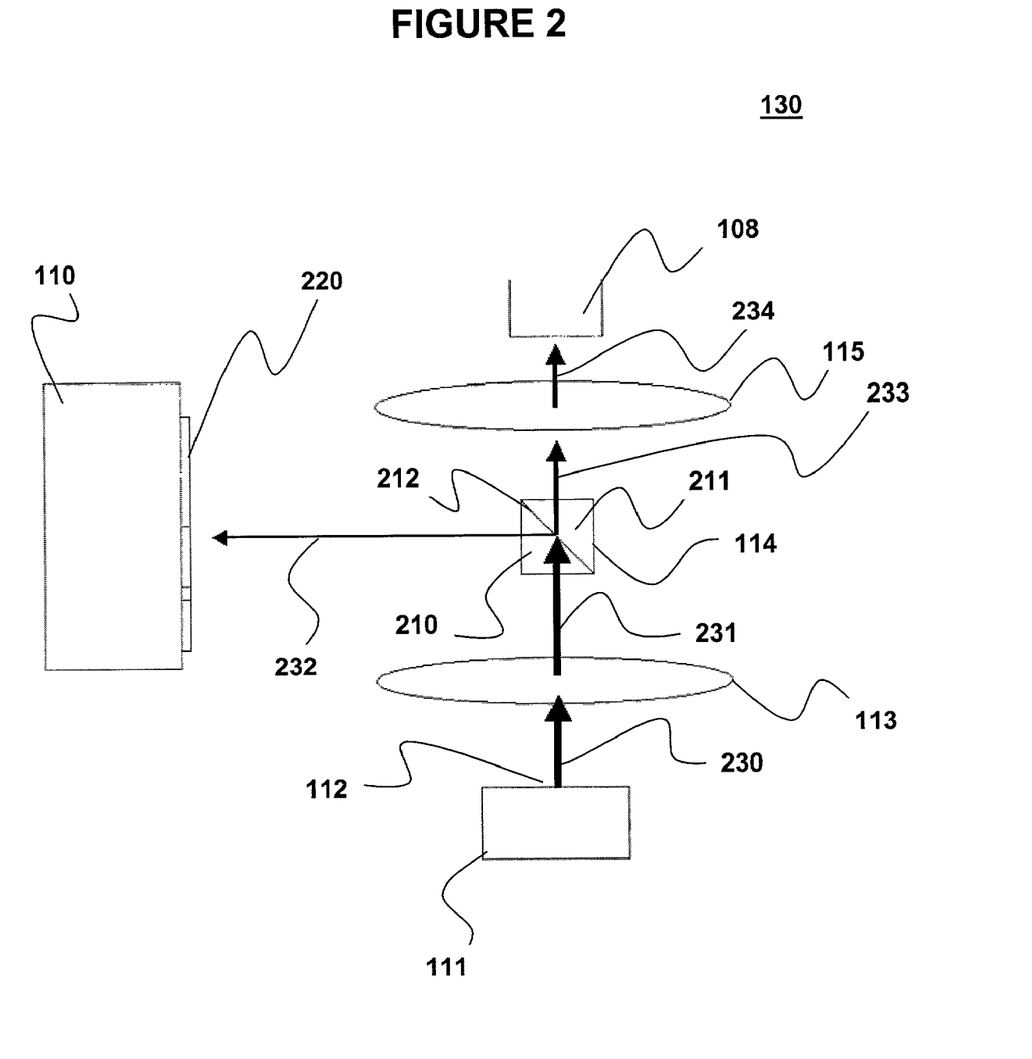
FIG. 2 illustrates a detail area of one embodiment of the present invention.

FIG. 2 illustrates a detail area of one embodiment of the present invention. Illustrated in FIG. 2, a top view of detail area 130, including the semiconductor light source 111, the first and second lenses 113–114, the optical fiber 108, the photodetector 110, and the BSC 114, is shown in block diagram form.

As previously described in FIG. 1, the semiconductor light source 111 is optically coupled to the first lens 113, the first lens is 113 optically coupled to the BSC 114, the BSC 114 is optically coupled to the photodetector 110 and the second lens 115, and the second lens 115 is optically coupled to the optical fiber 108.

In one embodiment, the BSC 114 is comprised of a first right angle prism 210 and a second right angle prism 211 having the two right angle prisms 210–211 adhesively joined at the hypotenuse 212. The BSC 114 may be made of a high quality glass, such as, but not limited to, BK7A glass. Additionally, the hypotenuse 212 may have a coating to reflect a percentage of light, such as, but not limited to, a multilayer dielectric material. The multilayer dielectric material may be based at least upon the percentage of light to be reflected. An example of a BSC may be a laser-line nonpolarizing dielectric cube beamsplitter available from Melles Griot of Irvine, Calif.

Additionally, shown in FIG. 2, the photodetector 110 has a window 220 to receive light for monitoring the semiconductor light source 111. As alluded to earlier, the photodetector 110 may be advantageously placed in various manners, in accordance with various embodiments of the present invention.

In the embodiment illustrated in FIG. 2, the semiconductor light source 111 provides a first light beam 230 output from the front facet 112 to the first lens 113. As alluded to earlier, the first light 230 may be any type of coherent light, such as, but not limited to, laser light that has data encoded thereon. The first lens 113 may be utilized to modify the first light beam 230 resulting in a modified first light beam 231. The modification may be in the form of collimating the first light beam 230 (i.e., straightening the light beam). The properties of the first light beam output 230 and the modified first light beam 231 may be substantially identical because the first lens 113 does not negatively impact the first light beam 230 (i.e., integrity, power, encoded data, and the like are maintained).

The modified first light beam 231 propagates through the first lens 113 onto the BSC 114. Modified first light beam 231 incidences on the hypotenuse 212 of the BSC 114 having the dielectric coating. Based at least upon the principles of frustrated total internal reflection (FTIR) and the dielectric coatings at the hypotenuse 212, a first predetermined percentage of the modified first light beam 231 is split by the BSC 114, in particular, the hypotenuse 212, resulting in a first split output 232 from the BSC 114. Additionally, based at least upon the principles of FTIR and the dielectric coatings at the hypotenuse 212, a second predetermined percentage of the collimated light 231 is transmitted through the BSC 114, in particular, the hypotenuse 212, resulting in a second split output 233 from the BSC 114.

Due to the characteristics of splitting the modified first light beam 231 by BSC 114, the BSC 114 has a negative impact on the modified first light beam 231, such as, on the encoded data included in the first light beam output 230. However, the negative impact may be within a predetermined limited threshold. That is, the first percentage for the first split output 232 may be small relative to the first light beam output 230, such as, but not limited to a 2%. Accordingly, 2% of the first modified first light beam 231 makes up the first split output 232 from the BSC 114, and 98% of the modified first light beam 231 makes up the second split output 233 from the BSC 114. The predetermined limited threshold may be based at least upon properties of the first light beam output 230, such as but not limited to, signal tolerance, and accordingly, smaller percentages may be split. Additionally, the predetermined limited threshold may be based at least upon properties of the photodetector 110, such as but not limited to, sensitivity of the photodetector 110. Accordingly, alternatively, based at least upon the predetermined limited threshold of the light beam, the first percentage for the first split output 232 may be large relative to the first light beam output 230.

First split output 232 from the BSC 114 is shown directed towards the window 220 of the photodetector 110, where the photodetector 110 receives the first split output 232 to facilitate monitoring of the semiconductor light source 111 (i.e., properties of first light beam output 230). As alluded to earlier, the photodetector 110 converts the first split output 232 into electrical energy (i.e., electrical signals) that may be provided to the processor, wherein the electrical signals may be compared to characterization data. The characterization data may relate electrical signals from the photodetector 110 produced by the first split output 232 received by the photodetector 110 of the first light beam output 230 from the semiconductor light source 111. For example, referring to FIG. 2, characterization data may be produced by having several data points corresponding to power of light of the first light beam output 230 from the front facet 112 as compared to the power of light of the first split output 232, thereby calibrating the photodetector 110 to properly monitor the semiconductor light source 111.

Second split output 233 from the BSC 114 continues in the original optical path towards the second focusing lens 115. The second lens 115 may be utilized to modify the second split output 233 resulting in a modified second split light beam 234. The modification may be in the form of focusing second split output 233 to facilitate efficient optical coupling of the optical fiber 108. The properties of the second split output 233 and the modified second split light beam 234 may be substantially identical because the second lens 113 does not negatively impact the first light beam 230 (i.e., integrity, power, encoded data, and the like are maintained).

As a result, monitoring of a semiconductor light source utilizing a beamsplitter within a photonic package is facilitated.

In one embodiment, the optical fiber 130 may be of a type that is fabricated with an integrated lens end (not shown). Accordingly, the second lens may not be present because the second split output 233 may be focused to the optical fiber 108 by the integrated lens end of the optical fiber 108.

In one embodiment, the semiconductor light source 111 may be of a type that provides a collimated light beam. Accordingly, the first lens may not be present because the first light beam 230 output from the front face 112 may already be collimated.

In one embodiment, the semiconductor light source of the type that provides a collimated light beam and the optical fiber of the type that is fabricated with an integrated lens end may be combined. Accordingly, the first and second lens 113 & 115 may be not present.

In one embodiment, first split output 232 from the BSC 114 may be indirectly monitored within the housing 120 of the photonic package 100. An example of indirect monitoring may be found in co-pending U.S. patent application Ser. No. 10/087,877, titled "INDIRECT MONITORING OF SEMICONDUCTOR LIGHT SOURCE WITHIN A PHOTONIC PACKAGE", contemporaneously filed and having at least partial common inventorship with the present application. The application is hereby fully incorporated by reference.

Figure 3:
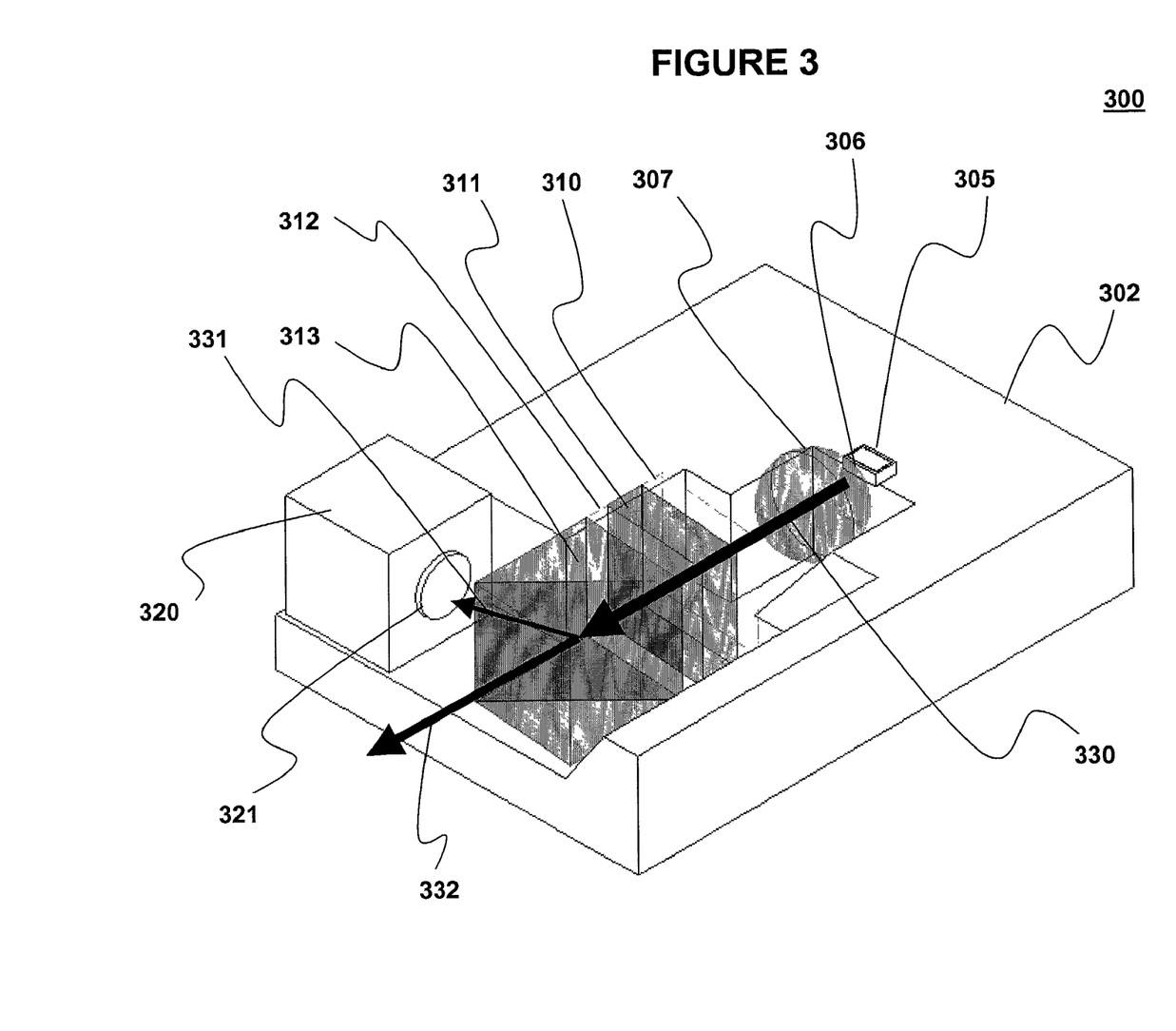
FIG. 3 illustrates monitoring of a semiconductor light source utilizing a beamsplitter within a photonic package, in accordance with an alternate embodiment of the present invention.

FIG. 3 illustrates monitoring of a semiconductor light source utilizing a beamsplitter within a photonic package, in accordance with an alternate embodiment of the present invention. Illustrated in FIG. 3, is a perspective view of a photonic package 300 incorporating the present invention. The photonic package 300 includes a substrate 302 upon which various components may be mounted. In the illustrated embodiment, mounted on the substrate 302 is a semiconductor light source 305, however, as described previously, it should be appreciated that commonly, numerous components may be mounted on the substrate 302. The semiconductor light source 305, in particular, has a front facet 306. In the embodiment illustrated in FIG. 3, a single lens 307 is optically coupled to the front facet 306 of the semiconductor light source 305. Additionally, illustrated in FIG. 3, a first polarizing element 310 is optically coupled to the single lens 307, and a light isolator element 311 is optically coupled to the first polarizing element 310. Additionally, a second polarizing element 312 is optically coupled to the light isolator element 311, and a beam splitter cube (BSC) 313 is optically coupled to the second polarizing element 312, which in turn, may be coupled to an optical fiber (not shown).

In the embodiment illustrated in FIG. 3, a photodetector 320 is advantageously disposed in such a manner as to monitor light from the from the semiconductor light source 305 away from the optical path of light. The photodetector 320 has a window 321 to receive light for monitoring the semiconductor light source 305. In one embodiment, the photodetector 320 is disposed in a substantially perpendicular manner, as shown. Furthermore, as described previously with respect to FIG. 1, the photonic package 300 may be included in a housing (not shown).

Illustrated in FIG. 3, a first light beam 330 from the semiconductor light source 305, in particular, the front facet 306, is collimated by the single lens 307, and proceeds to the first polarizing element 307. Generally, the first polarizing element 310 polarizes the first light beam 330, the light isolator element 311 rotates the first light beam 330 a predetermined angle, and the first light beam 330 is polarized by the second polarizing element 312 to provide the first light beam 330 to an optical fiber (not shown). However, in the illustrated embodiment of the present invention of FIG. 3, after the second polarizing element 312, the first light beam 330 is provided to the BSC 313. The BSC 313 creates a first split output 331 that negatively impacts data encoded on the first light beam 330 within a predetermined limited threshold. The first split output 331 is received by the photodetector 320, in particular, the window 321. A second split output 332 is provided from the BSC 313 to an optical fiber (not shown).

As previously described, the semiconductor light source 305 may be a semiconductor laser, such as, but not limited to, a gallium arsenide (GaAs) type laser. The semiconductor light source is known in the art, and accordingly, will not be described in further detail The single lens 307 may be of any type, such as, but not limited to, a spherical lens mad of high quality glass.

In the illustrated embodiment of FIG. 3, the first polarizing element 310, the light isolator element 311, and the second polarizing element 312 may facilitate optical isolation, and may be referred to as an optical isolator type structure. Generally, an optical isolator type structure facilitates prevention of backward reflected light that may affect the integrity of signal from a semiconductor light source. Accordingly, the first and second polarizing elements 310 & 312 may be of any type, such as, but not limited to, polarizer plates. The light isolator element 311 may be of any type to provide a Faraday effect, such as, but not limited to, bismuth garnet that may be affected by magnetic fields. However, in the illustrated embodiment of the present invention of FIG. 3, the optical isolator type structure incorporates the BSC 313.

As previously described, the BSC 313 may be, in one embodiment, comprised of a first right angle prism and a second right angle prism having the two right angle prisms adhesively joined at the hypotenuse. The BSC 313 may be made of a high quality glass, such as, but not limited to, BK7A glass. Additionally, the hypotenuse has a coating to reflect a percentage of light, such as, but not limited to, a multilayer dielectric material. The multilayer dielectric material may be based at least upon the percentage of light to be reflected. An example of a BSC may be a laser-line nonpolarizing dielectric cube beamsplitter available from Melles Griot of Irvine, Calif.

As previously described, the photodetector 320 is disposed on a tracing (not shown) to facilitate transmission of electrical signals output by the photodetector 320 responsive to received light to a processor (not shown), thereby calibrating the photodetector 320 to properly monitor the semiconductor light source 305. Here again, the photodetector 320 is adapted to produce an electrical signal responsive to received light based at least upon properties of the photodetector 320 such as, but not limited to, spectral responsivity, external quantum efficiency, noise, response time, dark current, and junction capacitance. The photodetector 320 may be a photodiode, such as, but not limited to, p-layer, intrinsic layer, and n-layer (p-i-n) junction photodiode, an Schottky photodiode, or an avalanche photodetector.

It should be noted that while for ease of explanation, the present invention is being described in the context of light beam having data encoded thereon, however, based on the description to follow, those skilled in the art will appreciate that the present invention may be adapted to other applications besides light beam having data encoded thereon, where light monitoring is required. For example, a continuous wave laser module, which require light monitoring.

In one embodiment, the BSC 313 illustrated in FIG. 3 may be of the polarizing type, where the BSC 313 is disposed in such a manner as to receive the first light beam 330 directly from the light isolator device 311. The polarizing type BSC creates the first split output 331 of the first light beam 330 to be received by the photodetector 320.

In one embodiment, the light isolator element 311 illustrated in FIG. 3, may be cleaved to facilitate beam splitting by the rotating element 311. The cleaved light isolator element 311 may be comprised of a first right angle light isolator element and a second right angle light isolator element, having the two right angle prisms adhesively joined at the hypotenuse similar to the BSC previously described. thus, the BSC of FIG. 3, may be omitted, and instead, the light isolator element 311 may create the first split output 331. The first split output 331 may be created by the cleaved light isolator element by the predetermined application of magnetic fields. Accordingly, for this embodiment, the beam splitter may be made of any type to provide a Faraday effect, such as, but not limited to, bismuth garnet that may be affected by magnetic fields.

In one embodiment, an electro-optic (EO) modulator incorporates the BSC 114 & 313, where the EO provides information on a light beam, such as, the first light beam output 230 & 330. Accordingly, an EO element that is capable of varying the light beam at high speeds in a controlled manner, such as, but not limited to, a synthetic magnetic crystal, may be cleaved, as previously described. An example of an EO element may be a crystal, such as, but not limited to, yttrium-iron garnet type. Except for the novel aspects of integrating beam splitters within the an EO, EOs are known, and accordingly will not be described further.

As a result, monitoring of a semiconductor light source is improved by facilitating utilizing a beamsplitter within a photonic package. Additionally, an optical isolator type structure advantageously incorporates the beamsplitter.

As alluded to earlier, in yet another embodiment, the first split output 331 from the BSC 313 may be indirectly monitored within the housing (not shown) of the photonic package 300. An example of indirect monitoring may be found in co-pending U.S. patent application Ser. No. 10/087,877, titled "INDIRECT MONITORING OF SEMICONDUCTOR LIGHT SOURCE WITHIN A PHOTONIC PACKAGE", contemporaneously filed and having at least partial common inventorship with the present application. The application is hereby fully incorporated by reference.

Figure 4:
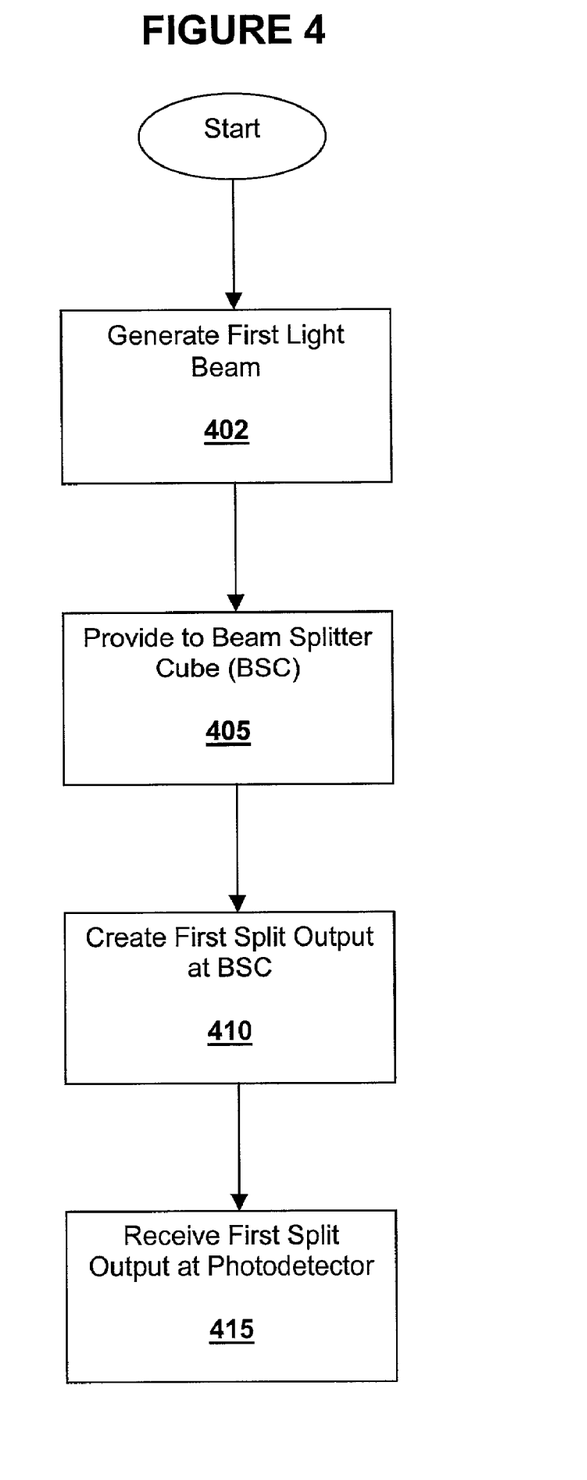
FIG. 4 illustrates operational flow for monitoring of a semiconductor light source utilizing a beam splitter cube within a photonic package, in accordance with one embodiment of the present invention.

FIG. 4 illustrates operational flow for monitoring of a semiconductor light source utilizing a beam splitter cube within a photonic package, in accordance with one embodiment of the present invention. At block 402, a first light beam output is generated by a semiconductor light source that is disposed within a housing. The first light beam output, having data encoded thereon, is provided to a beam splitter cube (BSC) that is also disposed within the housing, at block 405. The BSC, having a light beam characteristic that negatively impacts the encoding of the data in the first light beam, creates a first split output of the first light beam output, at block 410. The negative impact on the encoding of the data in the first light beam is within a predetermined limited threshold.

At block 415, the first split output is received at a photodetector disposed within the housing. The photodetector is adapted to determine properties of the first split output notwithstanding the first split output being created in the limited impact manner.

Thus, it can be seen from the above descriptions, a novel method and apparatus for monitoring of a semiconductor light source utilizing a beamsplitter within a photonic package, has been described.

The above description of illustrated embodiments of the invention, including what is described in the Abstract, is not intended to be exhaustive or to limit the invention to the precise forms disclosed. While specific embodiments of, and examples for, the present invention are described herein for illustrative purposes, various equivalent modifications are possible within the scope of the invention, as those skilled in the relevant art will recognize. Thus, the description is to be regarded as illustrative instead of restrictive on the invention.

What is claimed is:

1. A photonic package comprising:
a housing;
a semiconductor light source disposed within the housing, the semiconductor light source having a first light beam output having data encoded thereon;
a beam splitter cube (BSC) disposed inside the housing to create a first split output comprising a reflected portion of said first light beam output; and
a photodetector disposed inside the housing to receive the first split output, with the photodetector being adapted to produce an electrical slgnai responsive to the received first split output to facilitate monitoring of the semiconductor iight source by:
providing the electrical signal to a processor, the processor being adapted to calibrate the photodetector based at least in part on a comparison of the electrical signal to characterization data.

2. The photonic package of claim 1 further comprising a first lens, optically coupled to the semiconductor light source, the first lens equipped to collimate the first light beam output, a second split output of said first light beam output created by the BSC, and a second lens, optically coupled to the BSC and an optical fiber, the second lens equipped to focus the second spiit output to the optical fiber.

3. The photonic package of claim 1, wherein BSC comprises a BSC incorporated with an electro-optic (EO) modulator.

4. The photonic package of claim 3, wherein the BSC further comprises a cleaved yittrium-iron garnet type crystal.

5. The photonic package of claim 1, wherein the semiconductor light source comprises a semiconductor laser.

6. The photonic package of claim 5, wherein the semiconductor laser comprises a gallium arsenide based semiconductor laser.

7. The photonic package of claim 1, wherein the BSC comprises a nonpolarizing dielectric BSC.

8. The photonic package of claim 7, wherein the nonpolarizing dielectric BSC comprises a first right angle prism and a second right angle prism adhesively Joined at the hypotenuse.

9. The photonic package of claim 1, wherein the BSC comprises a BSC having a dielectric material to create the first split output.

10. The photonic package of claim 1, said BSC having a light beam splitting characteristic that negatively impacts said encoding of said data in said first light beam within a predetermined limited threshold, wherein the predetermined limited threshold comprises the first split output being of a percentage of the first light beam output.

11. The photonic package of claim 10, wherein the percentage of the first light beam output is 2%.

12. The photonic package of claim 1, wherein the BSC comprises a BSC made of a high quality glass.

13. The photonic package of claim 12, wherein the high quality glass is BK7A glass.

14. The photonic package of claim 1, whereIn the photodetector comprises a photodiode.

15. The photonic package of claim 14, wherein the photodiode comprises a p-i-n junction photodiode.

16. The photonic package of claim 1 further comprising a processor to receive the electrical signar responsive to the received first split output from the photodetector.

17. The photonic package of claim 16, wherein the processor comprises a processor having at least access to characterization data to facilitate calibration of the received first split output.

18. A method of monitoring a semiconductor light source utilizing a beamsplitter cube (BSC), comprising:
generating a first light beam output by the semiconductor light source that is included in a housing, the first light beam output having data encoded thereon;
providing the first light beam output to the BSC that is included in the housing;
creating a first split output of the first light beam output at said BSC comprising a reflected portion of said first light beam output; and
providing the first split output to a photodetector that is disposed within the housing, the photodetector adapted to produce an electrical signal responsive to the received first split output to facilitate monitoring of the semiconductor light source by executing a processor to calibrate the photodetector based, at least in part, on a comparison of the electrical signal to characterization data.

19. The method of claim 18 further comprising collimating the first light beam output;
creating a second split output of the first light beam output at said BSC;
optically coupling the BSC to an optical fiber; and
focusing the second spiit output to the optical fiber.

20. The method of claim 18 further comprising receiving the electrical signal responsive to the received first split output from the photodetector at a processor via a trace electrically coupled to the photodetector and the processor.

21. A photonic package comprising:
a housing;

a semiconductor light source disposed within the housing, the semiconductor light source having a first light beam output having data encoded thereon;

an optical isolator structure optically coupled to the semiconductor light source and disposed inside the housing, the optical isolator structure having a beam splitter cube (BSC) to create a first split output comprising a reflected portion of said first light beam output; and a photodetector disposed inside the housing to receive the first split output, with the photodetector being adapted to produce an electrical signal responsive to the received first split output to facilitate monitoring of the semiconductor light source by:

providing the electrical signal to a processor, the processor being adapted to calibrate the photodetector based, at least in part, on a comparison of the electrical signal to characterization data.

22. The photonic package of claim 21 further comprising a lens, optically coupled to the semiconductor light source, the lens equipped to collimate the first light beam output, a second split output of said first light beam output created by the BSC and being provided to an optical fiber.

23. The photonic package of claim 21, wherein the semiconductor light source comprises a semiconductor laser.

24. The photonic package of claim 23, wherein the semiconductor laser comprises a gallium arsenide based semiconductor laser.

25. The photonic package of claim 21, wherein the BSC comprises a nonpolarizing dielectric BSC.

26. The photonic package of claim 25, wherein the BSC comprises a BSC having a dielectric material to create the first split output.

27. The photonic package of claim 21, wherein the BSC comprises a polarizing dielectric BSC.

28. The photonic package of claim 27, wherein the BSC comprises a BSC having a dielectric material to create the first split output.

29. The photonic package of claim 21, wherein the BSC comprises a cleaved light isolator element.

30. The photonic package of claim 29, wherein the light isolator element comprises a bismuth garnet.

31. The photonic package of claim 21, the BSC having a light beam splitting characteristic that negatively impacts said encoding of said data In said first light beam within a predetermined threshold, wherein the predetermined limited threshold comprises the first split output being of a percentage of the first light beam output.

32. The photonic package of claim 31, wherein the percentage of the first light beam output is a maximum of 2%.

* * * * *

UNITED STATES PATENT AND TRADEMARK OFFICE
CERTIFICATE OF CORRECTION

PATENT NO.       : 7,204,647 B2
APPLICATION NO.  : 10/087878
DATED            : April 17, 2007
INVENTOR(S)      : David R. Ohm It is certified that error appears in the above-identified patent and that said Letters Patent is hereby corrected as shown below:

In column 9, claim 1, line 46, the word "slgni" should be --signal--.

In column 9, claim 1, line 48, the word "iight" should be --light--.

In column 9, claim 2, line 59, the word "spiit" should be --split--.

In column 10, claim 8, line 8, the word "Joined" should be --joined--.

In column 10, claim 14, line 25, the word "whereIn" should be --wherein--.

In column 10, claim 16, line 31, the word "signar" should be --signal--.

In column 10, claim 19, line 60, the word "spiit" should be --split--.

In column 12, claim 31, line 19, the word "In" should be --in--.

Signed and Sealed this

Sixteenth Day of October, 2007

JON W. DUDAS
*Director of the United States Patent and Trademark Office*